United States Patent
Gyde et al.

(10) Patent No.: US 6,664,945 B1
(45) Date of Patent: Dec. 16, 2003

(54) SYSTEM AND METHOD FOR CONTROLLING COMMUNICATION AND NAVIGATIONAL DEVICES

(75) Inventors: Mike G. Gyde, Cave Creek, AZ (US); Tom V. Eich, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 387 days.

(21) Appl. No.: 09/680,582

(22) Filed: Oct. 6, 2000

Related U.S. Application Data

(60) Provisional application No. 60/233,825, filed on Sep. 19, 2000.

(51) Int. Cl.$^7$ .................................................. G09G 5/00
(52) U.S. Cl. ........................ 345/156; 340/945; 340/995; 701/14
(58) Field of Search ............................... 345/156–157, 345/763–764, 829–830; 701/14, 11; 340/990, 995, 945, 971, 973; 455/431

(56) References Cited

U.S. PATENT DOCUMENTS

| | | | | |
|---|---|---|---|---|
| 5,057,835 A | * | 10/1991 | Factor et al. ................ 340/995 |
| 5,931,874 A | | 8/1999 | Ebert et al. .................... 701/1 |
| 5,978,715 A | * | 11/1999 | Briffe et al. .................. 701/11 |
| 6,104,969 A | | 8/2000 | Beeks ............................ 701/1 |
| 6,112,141 A | | 8/2000 | Briffe et al. .................. 701/14 |
| 6,160,497 A | * | 12/2000 | Clark ......................... 340/961 |
| 6,282,417 B1 | * | 8/2001 | Ward .......................... 455/431 |
| 6,346,892 B1 | * | 2/2002 | DeMers et al. ............. 340/945 |

FOREIGN PATENT DOCUMENTS

| | | |
|---|---|---|
| EP | 0 763 714 A2 | 3/1997 |
| JP | 08234886 A | 9/1996 |

\* cited by examiner

*Primary Examiner*—Richard Hjerpe
*Assistant Examiner*—Francis Nguyen

(57) ABSTRACT

A system and method for graphically controlling a communication device and displaying its characteristics on a display within a vehicle including a microprocessor, a communication and navigation information window within a portion of the display, the window being generated by and in communication with the microprocessor, at least one radio in communication with and controlled by the microprocessor, a data input means in communication with the microprocessor and at least one communication and navigation information database in communication with the microprocessor. An aircraft operator provides input to a cursor control device and receives visual feedback via a display produced by a monitor. The display includes various graphical elements associated with each radio's characteristics. Through the use of the cursor control device, the operator may modify the radio's characteristics and/or other such indicia graphically in accordance with feedback provided by the display.

21 Claims, 2 Drawing Sheets

US 6,664,945 B1

SYSTEM AND METHOD FOR CONTROLLING COMMUNICATION AND NAVIGATIONAL DEVICES

REFERENCE TO RELATED APPLICATION

This application claims priority from and the benefit of U.S. Provisional Patent Application Ser. No. 60/233,825. filed Sep. 19, 2000. the entire contents of which are hereby incorporated by reference.

FIELD OF THE INVENTION

The present invention relates generally to communication and navigational devices, and more particularly to the control and display of communication and navigational devices within an avionics system.

BACKGROUND OF THE INVENTION

A pilot's awareness and coordination of various aircraft modes and conditions is often critical to optimum aircraft performance and safety. For example, the pilot requires awareness of the aircraft's automation state to easily coordinate the flight modes. Moreover, the pilot should be able to easily view and coordinate the tracking of the aircraft to current modes and targets. The pilot and co-pilot should also be able to easily control all communication and navigational radios on the aircraft regardless of the flight mode However, existing cockpit controls, which may be of the panel-mounted variety or of the head up display (HUD) variety and which may be commonly found in commercial, military, and civilian aircraft, include various systems distributed throughout the cockpit, thereby often requiring the pilot to intermittently scan various areas of the cockpit to obtain and analyze the aircraft information. Moreover, various communication controls may be spaced throughout the cockpit, which may require the pilot and the co-pilot to reach into each other's immediate space in order to modify or select the controls. The current arrangement of such controls throughout the cockpit does not allow the pilots to fly the aircraft as efficiently as possible.

To assist the pilot, aircraft flight displays continue advancing, achieving increasingly higher levels of information density and, consequently, presenting a greater amount of visual information for the operator. In many applications, it is often important that visual displays provide a proper cognitive mapping between what the operator is trying to achieve and the information available to accomplish the task. As a result, such systems increasingly utilize human-factor design principles in order to build instrumentation and controls that work cooperatively with human operators.

Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, annunciators, and the like. Similarly, detailed guidelines related to electronic displays can be found in FAA Advisory Circular 20–88A, *Guidelines on the Marking of Aircraft Powerplant Instruments* (Sep. 1985), both of which are incorporated by reference.

Typical communication and navigation radios used today are manually intensive to control. For example, a typical communication radio within an aircraft includes a plurality of buttons, flip switches and/or rotatable tuning knobs. The rotatable tuning knobs control the particular frequency the radio is transmitting and receiving. If the vehicle's operator desired to change the frequency, the tuning knobs must be rotated. If the frequency shift is large, the operator is required to continually rotate the knobs until the desired frequency is achieved. This can be a cumbersome chore. This problem is exacerbated when there are multiple communication radios and navigation radios throughout the cockpit. Communication and navigation radios are typically located in the upper portion of the flight deck outside of the pilot's primary scanning view but within arms reach. The placement of these radios further takes the pilot's attention away from his primary duty to operate the aircraft. Consequently, the reaction time associated with adjusting the characteristics of each radio throughout the cockpit may potentially affect the safe operation of the vehicle.

What is needed is a system for controlling and displaying communication devices and navigational devices, and storing information relating to such devices in an easy and efficient manner which allows the vehicle's operator to concentrate on the primary task of operating the vehicle.

BRIEF SUMMARY OF THE INVENTION

The present invention is, in one embodiment, a system and method for graphically controlling a communication device and displaying its characteristics on a display within a vehicle including a microprocessor, a communication and navigation information window within a portion of the display, the window being generated by and in communication with the microprocessor, at least one radio in communication with and controlled by the microprocessor, a data input means in communication with the microprocessor and at least one communication and navigation information database in communication with the microprocessor. An aircraft operator provides input to a cursor control device and receives visual feedback via a display produced by a monitor. The display includes various graphical elements associated with each radio's characteristics. Through the use of the cursor control device, the operator may modify the radio's characteristics and/or other such indicia graphically in accordance with feedback provided by the display.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

DETAILED DESCRIPTION OF THE INVENTION

Figure 1:
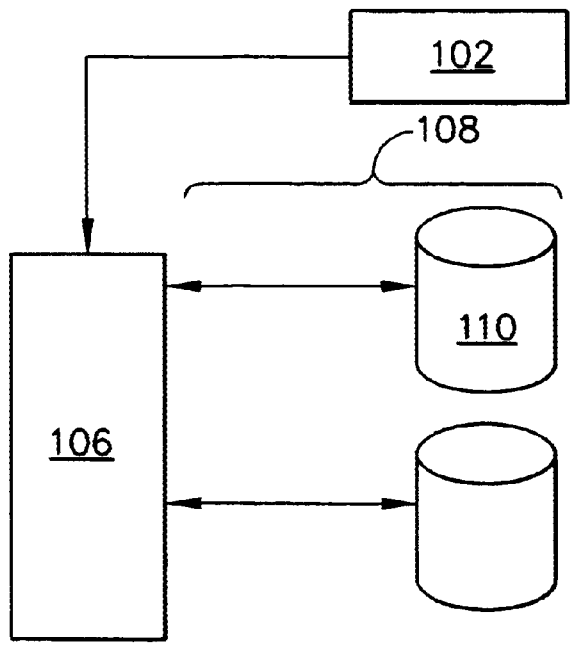
FIG. 1 shows an exemplary prior art primary flight display with a separate radio management unit.

The present invention may be described herein in terms of functional block components and various processing steps known to those of skill in the art. Such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Moreover, it should be understood that the exemplary process illustrated may include more or less steps or may be performed in the context of a larger processing scheme. Furthermore, the various flowcharts or methods presented in the drawing figures or the specification are not to be construed as limiting the order in which the individual process steps may be performed.

FIG. 1 illustrates an exemplary radio communications system within a vehicle of the prior art. In this type of system, a processor 106 is configured to communicate with one or more data sources 108 and at least one communication or navigation radio 102. The controls for radio 102 are typically placed adjacent to the operator's line of sight on the primary vehicle control panel, but as explained previously, such controls may be arranged throughout the operator's environment. In general, a user (e.g., a pilot) located within a vehicle (e.g., aircraft, which is not shown) may provide input to processor 106 via a front control panel of the radio 102. As stated previously, the location of each radio 102 throughout the vehicle made it difficult for the vehicle operator to focus on operating the vehicle.

Figure 2:
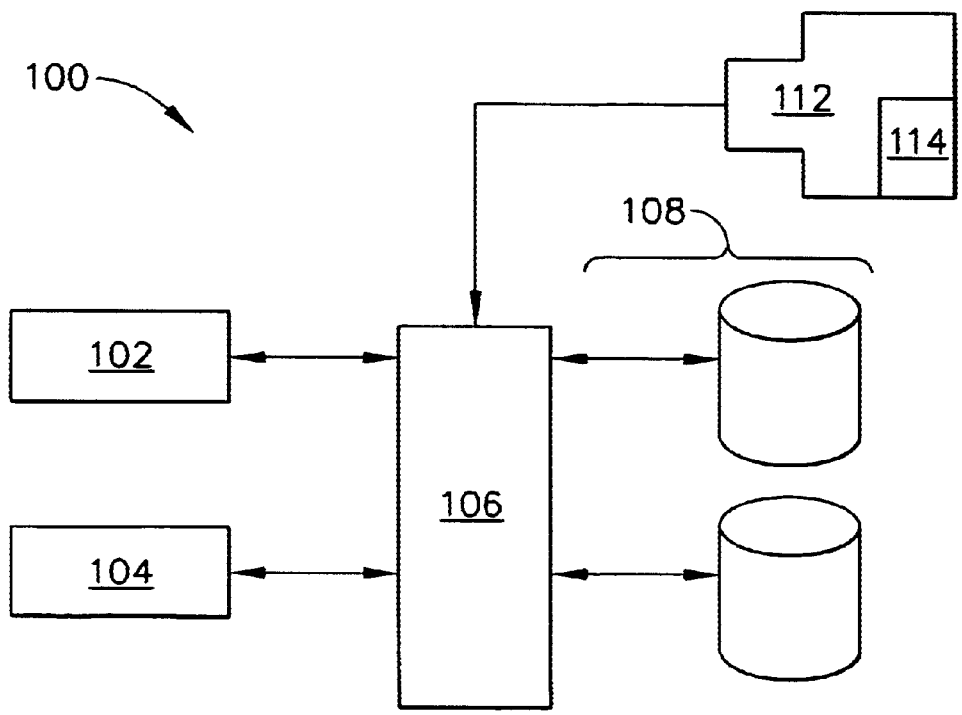
FIG. 2 illustrates a block diagram schematic of one embodiment of the present invention.
Figure 3:
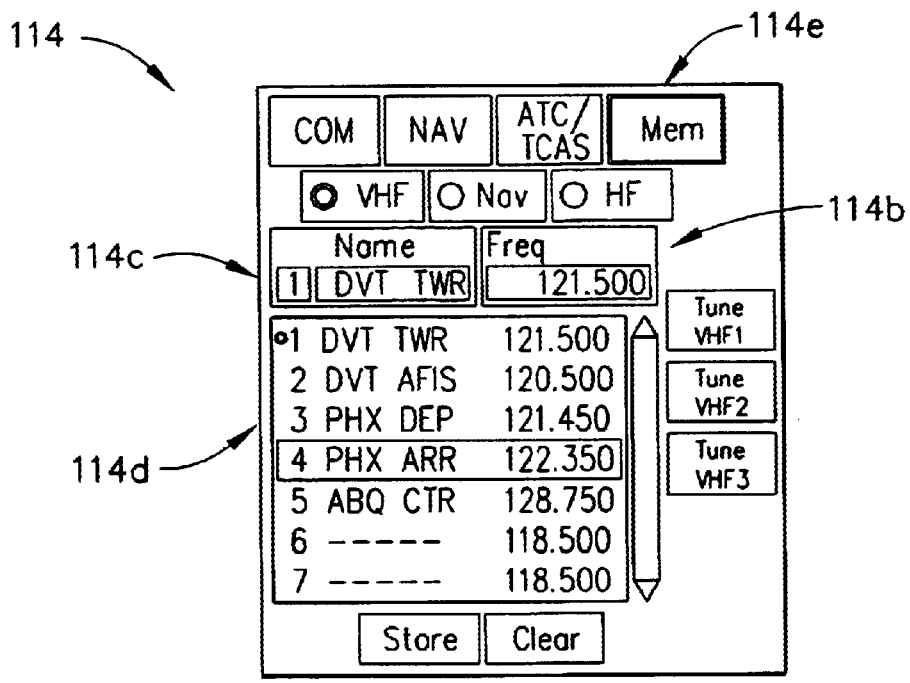
FIG. 3 shows an flight display including a radio management system according to the present invention.

FIG. 2 illustrates one embodiment of the present invention. In this embodiment, the present invention is a system 100 for graphically controlling a communication device's 102 characteristics on a portion 114 within a display 112 comprising a processor 106 configured to communicate with at least one monitor 112, one or more data sources 108 and a data input means 104. In general, a user (e.g., a pilot) located within a vehicle (e.g., aircraft, which is not shown) may provide input to processor 106 via an input device 104 and receive visual feedback regarding the status of the vehicle's communication and navigation devices 102 via a communication information window 114 produced by monitor 112. FIG. 3 illustrates one embodiment of the present invention as may be seen by the vehicle's operator on a display 112. Those of skill in the art will realize that system 100 may be suitably configured for use any vehicle which has a communication system.

According to one aspect of the present invention as seen in FIG. 2, the system for graphically controlling a communication device 102 on a display 112 generally includes a microprocessor 106, an information window 114 within a portion of the display 112 (as seen in FIG. 3, for example), at least one radio communication device 102 a data input means 104 and at least one information database 108, all in communication with the microprocessor 106. In one preferred embodiment, the information window 114 is generated by and in communication with the microprocessor 106, while each communication database 108 contains radio and communication information (such as pre-stored lookup tables corresponding to certain geographical locations and their respective communication frequencies). Preferably, each radio communication device can be selected from very high frequency communication radios, high frequency communication radios and navigation radios.

Moreover, as seen in FIG. 3, the information window may further preferably include a frequency tuning portion 114b, an alphanumeric text portion 114c adjacent to the tuning portion 114b, a scrollable stored frequency portion 114a adjacent to the text portion and the tuning portion and at least one selectable tab 114e adjacent to the tuning portion 114b and the text portion 114c, all in communication with the microprocessor 106.

Preferably, the data input means 104 is a cursor control means having a cursor or like graphical symbol graphically and dynamically displayed within the window 114, or more particularly, an alphanumeric keyboard and mouse-like device. The cursor displayed within the window 114 may further change shape in the window 114 in response to data entered into the data input means 104. The data input means 104 may further include a multi-function keyboard with a viewable text entry portion (not shown), the text entry portion displaying text entered into the cursor control means by the operator which assists the operator in entering alphanumeric text.

The alphanumeric text portion 114c may be configured to allow data input corresponding to a predefined identifier (such as, for example, a geographic location such as "PHX" representing the City of Phoenix). Similarly, the frequency tuning portion 114b may be configured to allow data input corresponding to a predefined frequency so that the predefined frequency corresponds to the predefined identifier (e.g., the frequency 100.30 may correspond to a communication frequency for the City of Phoenix). As a means for quickly locating previously stored identifiers and frequencies, the stored frequency portion 114a is employed within window 114 to display at least one predefined identifier and a corresponding predefined frequency. It is a common practice in the operation of commercial vehicles to use multiple operators (such as pilots, for example) throughout the day, each operator potentially operating the same vehicle in different geographic locations (e.g., one pilot flying from Phoenix to Albuquerque, another pilot flying from Albuquerque to Las Vegas). As such, as those of skill in the art will now appreciate, communication frequencies and navigational frequencies can be stored and displayed by the stored frequency portion 114a whether during operation of the vehicle or otherwise, thereby giving a vehicle's various operators the ability to modify or retain desired frequencies. Further, the present invention minimizes the amount of physical work required by a vehicle operator to set or store such frequencies by allowing direct text entry corresponding to such frequencies and/or geographical locations.

System 100 is preferably configured such that display element 112 produces an enhanced rendering of various aspects of a communication system 100 and the communication system's characteristics (as illlustrated, for example, in FIG. 3) as viewed by the operator of the vehicle. A number of aspects of display element 112 (which are controlled by processor 106 in a practical embodiment) may contribute to the improved contents and appearance of the information window 114. The image generation and display aspects of the present invention may leverage known techniques such that existing communication systems can be modified in a straightforward manner to support the different features described herein. In a practical implementation, the concepts of the present invention may be realized in the form of revised display generation software or processing resident at processor 106.

Processor 106 encompasses one or more functional blocks used to provide flight management and control, control the on-board communication system, interface with the pilot, and input to monitor 112. Processor 106 may include or cooperate with any of the on-board radios within the communication system, such as high frequency communication radios, very high frequency radios and navigation radios. In addition, processor 106 may be configured to receive, analyze, condition, and process information received from the communication system. In this regard, processor 106 may include any number of individual microprocessors, flight computers, navigation equipment, memories, storage devices, interface cards, and other technologies known in the art. Moreover, processor 106 may include any number of microprocessor elements, memory elements, power supplies, and other functional components as necessary. In this respect, processor 106 may include or cooperate with any number of software programs or instructions designed to carry out various methods, process tasks, calculations, control functions, and the generation of display signals and other data used by display element 112 and the control and transfer of data between the communication system 100 and the display 112.

Display 112 may also include various graphical elements associated with the lateral position, vertical position, flight-plan and/or other indicia of the aircraft's operational state as determined from data sources 108. Display 112 may also be based on a panel mounted display, a HUD projection, or any known technology. Display 112 may include any number of conventional elements, e.g., visual indicators, alphanumeric text, lights, and the like.

In another embodiment, the present invention is implemented with a large 14.1" diagonal display to provide much more display surface area in front of the pilot. As such, the present invention is configured to allow the enlargement and enhancement of the annunciation areas while substantially maintaining the surface area allotted for other displays. Alternatively, the present invention is implemented within an 8Δx10" display or any other suitable display size.

Data 108 may include standard information related to the state of the vehicle. Data sources 108 include various types of data required by the system, for example, flight plan data, data related to airways, navigational aids (Navaids), symbol textures, navigational data, obstructions, font textures, taxi registration, Special Use Airspace, political boundaries, communication frequencies (enroute and airports), approach information, and the like.

Figure 4:
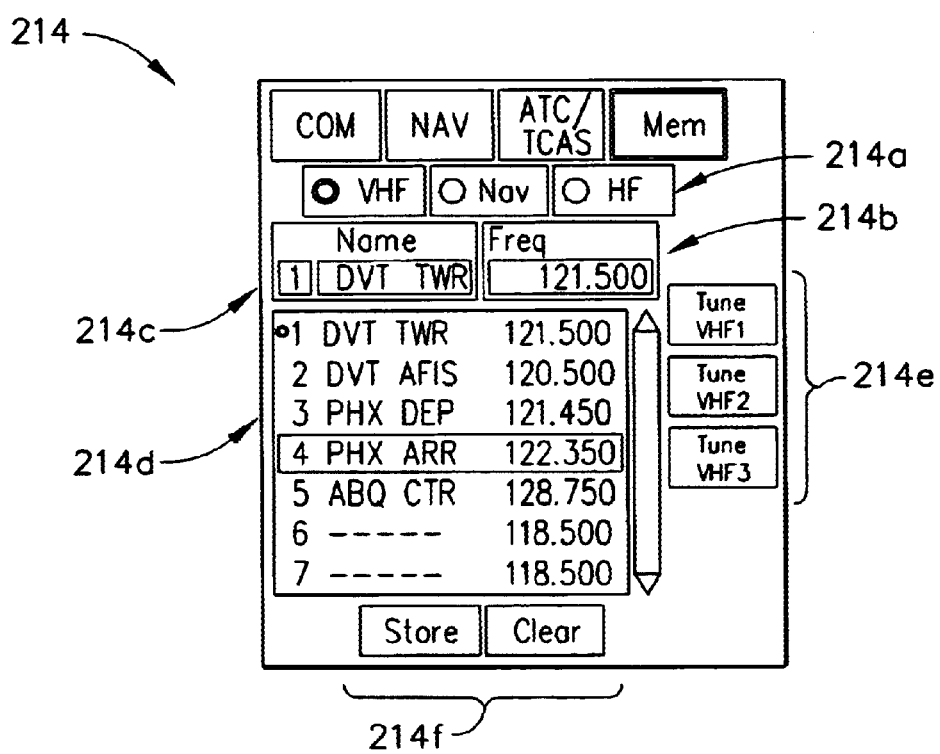
FIG. 4 shows an flight display including a radio management system according to another embodiment of the present invention.

In another embodiment as seen in FIG. 4, the present invention is a display system having a communication window 214 therein. In this embodiment, as illustrated in FIG. 4, the window contains at least one radio select means 214a, a selectable alphanumeric text portion 214c, a selectable frequency tuning portion 214b, a scrollable frequency list having a plurality of location and frequency records 214d and a plurality of radio tuning buttons 214e. Each of the radio select means 214a, the selectable alphanumeric text portion 214c, the selectable frequency tuning portion 214b, the scrollable frequency list 214d and the plurality of radio tuning buttons 214e in communication with and being controlled by a microprocessor 206 (not shown, but similar in disclosure to the operation of microprocessor 106).

The radio select means 214a correspond to memory locations for a particular radio (e.g., communication radio, navigational radio, high frequency radio, etc.) having stored geographical and frequency information. An operator would use radio select means 214a to select a particular radio 102 to control. The alphanumeric text portion 214c and the frequency tuning portion 214b are used to enter, clear or otherwise modify an item from any record within the frequency list 214d. The frequency list 214d identifies at least one predefined identifier record and a corresponding predefined frequency record. When either record is selected from the frequency list 214d, its contents are transferred to the text portion 214c and the frequency portion 214b where such contents can be modified by the operator via input device 204 (not shown). The storage select means 214f is employed by the operator to store or clear a record within the frequency list 214d. The storage select means 214f is configured only to store or clear those records displayed in the text portion 214c and the frequency tuning portion 214b.

In operation, the vehicle's operator may first select a radio tuner 214a within the information window 214 (e.g., "VHF") by the data input means 204. The operator can then select a record from the frequency list 214d, which displays the previously stored text and frequency information within the text portion 214c and the frequency portion 214b. The operator can then, though the data input means 204, enter a new frequency or text identifier as desired, select the storage select means 214f and store the new text or frequency in database 108. Those of skill in the art will appreciate that similar steps are taken to clear certain text or frequency records displayed in the frequency list 214d.

In the illustrated embodiment, certain visual cues are used to signal to the aircraft operator that the radio memory management system is activated. For example, the shape of the cursor may change or provide a particular characteristic to alert the operator that the radio memory management system is activated. Further, any alphanumeric field within the radio memory management system portion 214 of the display is preferably programmed to prevent unauthorized entry of invalid data (such as, for example, an invalid frequency) or to prevent entry of data in an unselected field. When the alphanumeric text entered within a field is acceptable, the user will accept the entry by appropriately selecting the CCD. The respective radio will then change its settings based upon the alphanumeric entry provided by the operator.

It should further be appreciated that the particular implementations shown and described herein are illustrative of the various embodiments of the invention and its best mode, and are not intended to otherwise limit the scope of the present invention in any way. For the sake of brevity, conventional techniques and components related to aircraft attitude detection, flight instrumentation, liquid crystal displays, HUDs, image rendering, landing and guidance methodologies, and other functional aspects of the systems (and components of the individual operating components of the systems) known to those of skill in the art may not be described in detail herein. Furthermore, the display images illustrated are exemplary in nature and are not intended to limit the scope or applicability of the present invention in any way.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a system for controlling communication devices and navigational devices, is followed.

The embodiments of an invention in which an exclusive property or right is claimed are defined as follows:

1. A vehicle display containing a communication information window, the window comprising:
   a. at least one radio select means;
   b. a selectable alphanumeric text portion;
   c. a selectable frequency tuning portion;
   d. a scrollable frequency list having a plurality of location and frequency records;
   e. at least one radio tuning button; and
   f. a storage select means in communication with the frequency list; the radio select means, text portion, tuning portion, frequency list, tuning buttons and storage select means each in communication with a microprocessor, the microprocessor in communication with at least one radio means, and each radio tuning button corresponding to each radio means.

2. The system of claim 1, the text portion being configured to allow data input corresponding to a predefined identifier.

3. The system of claim 2, the tuning portion being configured to allow data input corresponding to a predefined frequency, the predefined frequency corresponding to the predefined identifier.

4. The system of claim 3, the frequency list being configured to display at least one predefined identifier and a corresponding predefined frequency.

5. The system of claim 4, each radio tuning button being configured to display tuning characteristics of the radio select means selected, each button further allowing the characteristics to be changed in the text portion or the frequency tuning portion.

6. The system of claim 5, the storage select means allowing the entry or deletion of the predefined frequency or the predefined identifier.

7. The system of claim 6, each radio select means selected from the group consisting of very high frequency communication radios, high frequency communication radios and navigation radios.

8. A system for graphically controlling an aircraft communication device on a on of a display within aircraft, the system comprising:
   a. at least one radio tuner within the portion;
   b. a selectable alphanumeric text portion within the portion;
   c. a selectable frequency tuning portion within the portion;
   d. a scrollable frequency list within the portion, the frequency list having a plurality of location and frequency records;
   e. a storage select means within the portion, the storage select means in communication with the frequency list;
   f. at least one radio in communication with each radio tuner,
   g. a controllable cursor control device, the device accepting input from an operator; and
   h. a processor coupled to the cursor control device and the display portion, the processor processing input from the user to produce an image on the display portion viewable by the operator, the display portion further including a cursor symbol responsive to input from the cursor control device.

9. The system of claim 8, the text portion being configured to allow data input corresponding to a predefined identifier.

10. The system of claim 9, the tuning portion being configured to allow data input corresponding to a predefined frequency, the predefined frequency corresponding to the predefined identifier.

11. The system of claim 10, the frequency list being configured to display at least one predefined identifier and a corresponding predefined frequency.

12. The system of claim 11, each radio tuner being configured to display tuning characteristics of the radio select means selected, each tuner further allowing the characteristics to be changed in the text portion or the frequency tuning portion.

13. The system of claim 12, the storage select means allowing the entry or deletion of the predefined frequency or the predefined identifier.

14. The system of claim 13, each radio select means selected from the group consisting of very high frequency communication radios, high frequency communication radios and navigation radios.

15. A method for displaying communication information within a portion of a display on a vehicle, the method comprising:
   a. providing a window within the display;
   b. providing at least one radio select means within the window;
   c. providing a selectable alphanumeric text portion within the window;
   d. providing a selectable frequency tuning portion within the window;
   e. providing a scrollable frequency list within the window, the frequency list having a plurality of location and frequency records;
   f. providing at least one radio tuning button within the window; and
   g. providing a storage select means within the window, the storage select means in communication with the frequency list; the display, radio select means, text portion, tuning portion, frequency list, tuning buttons and storage select means each in communication with a microprocessor, the microprocessor in communication with at least one radio means, each radio tuning button corresponding to each radio means.

16. The method of claim 15, the text portion being configured to allow data input corresponding to a predefined identifier.

17. The method of claim 16, the tuning portion being configured to allow data input corresponding to a predefined frequency, the predefined frequency corresponding to the predefined identifier.

18. The method of claim 17, the frequency list being configured to display at least one predefined identifier and a corresponding predefined frequency.

19. The method of claim 18, each radio tuning button being configured to display tuning characteristics of the radio select means selected, each button further allowing the characteristics to be changed in the text portion or the frequency tuning portion.

20. The method of claim 19, the storage select means allowing the entry or deletion of the predefined frequency or the predefined identifier.

21. The method of claim 20, each radio select means selected from the group consisting of very high frequency communication radios, high frequency communication radios and navigation radios.

* * * * *